US009750371B2

United States Patent
Bungard et al.

(10) Patent No.: US 9,750,371 B2
(45) Date of Patent: Sep. 5, 2017

(54) COOLER

(71) Applicant: Jackson Kayak, Inc., Sparta, TN (US)

(72) Inventors: Damon Bungard, Spencer, TN (US); Mark Nordstrom, Sparta, TN (US)

(73) Assignee: Jackson Kayak, Inc., Sparta, TN (US)

( * ) Notice: Subject to any disclaimer, the term of this patent is extended or adjusted under 35 U.S.C. 154(b) by 23 days.

(21) Appl. No.: 14/811,725

(22) Filed: Jul. 28, 2015

(65) Prior Publication Data
US 2017/0027386 A1 Feb. 2, 2017

(51) Int. Cl.
F25D 23/00 (2006.01)
A47J 41/00 (2006.01)
B65D 55/02 (2006.01)
B65D 81/38 (2006.01)

(52) U.S. Cl.
CPC ....... *A47J 41/0055* (2013.01); *A47J 41/0088* (2013.01); *B65D 55/02* (2013.01); *B65D 81/3813* (2013.01)

(58) Field of Classification Search
CPC ...... A47J 41/0055; A45C 11/20; A45C 15/00; A45C 13/001; B67B 7/16; F25D 3/08; F25D 2303/0843
USPC ...................................... 220/592.2
See application file for complete search history.

(56) References Cited

U.S. PATENT DOCUMENTS

| 2003/0139169 A1* | 7/2003 | Arreazola, Jr. | ........ H04B 1/086 455/344 |
| 2005/0279123 A1* | 12/2005 | Maldonado | .............. A45C 5/02 62/457.7 |
| 2007/0193297 A1* | 8/2007 | Wilson | .................... F25D 29/00 62/371 |
| 2010/0102057 A1* | 4/2010 | Long | .................... A01N 1/0263 220/62.15 |
| 2015/0375918 A1* | 12/2015 | Holderness | .......... B67D 3/0067 222/566 |

* cited by examiner

*Primary Examiner* — Shawn M Braden
(74) *Attorney, Agent, or Firm* — Alleman Hall Creasman & Tuttle LLP

(57) ABSTRACT

Examples are disclosed herein that relate to a cooler having a securing structure. One example provides a cooler including a body, a lid movably coupled to the body, a recess formed in the body, a securing structure extending around at least a portion of the recess thereby forming a first lock receptacle, a second lock receptacle formed in the lid and positioned to align over the first lock receptacle when the lid is in a closed position, and a gap located between the securing structure and the lid, the gap being configured to accommodate a locking device when the lid is in the closed position.

20 Claims, 7 Drawing Sheets

COOLER

BACKGROUND

Portable coolers are used to maintain items, such as food and drink, at cooler temperatures than ambient. Portable coolers are often used in public places, such as campgrounds, parks, hunting/fishing areas, and the like, where the cooler and contents thereof may be vulnerable to theft.

SUMMARY

Examples are disclosed herein that relate to a cooler with securing features that allow the cooler to be locked in different configurations. One example provides a cooler including a body, a lid movably coupled to the body, a recess formed in the body, a securing structure extending around at least a portion of the recess thereby forming a first lock receptacle, a second lock receptacle formed in the lid and positioned to align over the first lock receptacle when the lid is in a closed position, and a gap located between the securing structure and the lid, the gap being configured to accommodate a locking device when the lid is in the closed position.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

When using coolers in public areas, a user may not always keep the cooler within sight. For example, a person may leave a cooler at a campsite or in the back of a truck to go enjoy outdoor activities. As such, the cooler and the contents thereof may be vulnerable to theft, as well as to animals attracted by the contents of the cooler.

To mitigate the risk of theft or breach by an animal, a cooler may include features permitting the cooler to be locked in a closed configuration and/or to another structure for security. For example, a cooler may include one or more receptacles for receiving a locking device, such as a padlock or cable lock. However, locking the cooler with such locking receptacles may prevent the lid from being opened, and thus may require the lock to be removed before the cooler can be opened.

Accordingly, examples are disclosed herein that relate to a cooler having a securing structure that allows the cooler to be locked (e.g. to an external object) in a configuration in which the lid can be opened, and also locked in a configuration in which the lid is locked in a closed position. Briefly, the cooler includes a body and a lid, a recess formed in the body, and a securing structure extending around at least a portion of the recess to form a first lock receptacle. A second lock receptacle is formed in the lid and aligns with the first lock receptacle when the lid is in a closed position, allowing the lid to be locked in a closed position. Further, a gap located between the securing structure and the lid when the lid is in the closed position accommodates a locking device, thereby allowing the cooler to be locked to an external object while also allowing the lid to be in a fully closed or open position. Additionally, in some implementations, the securing structure may include an integrated bottle opener.

Figure 1:
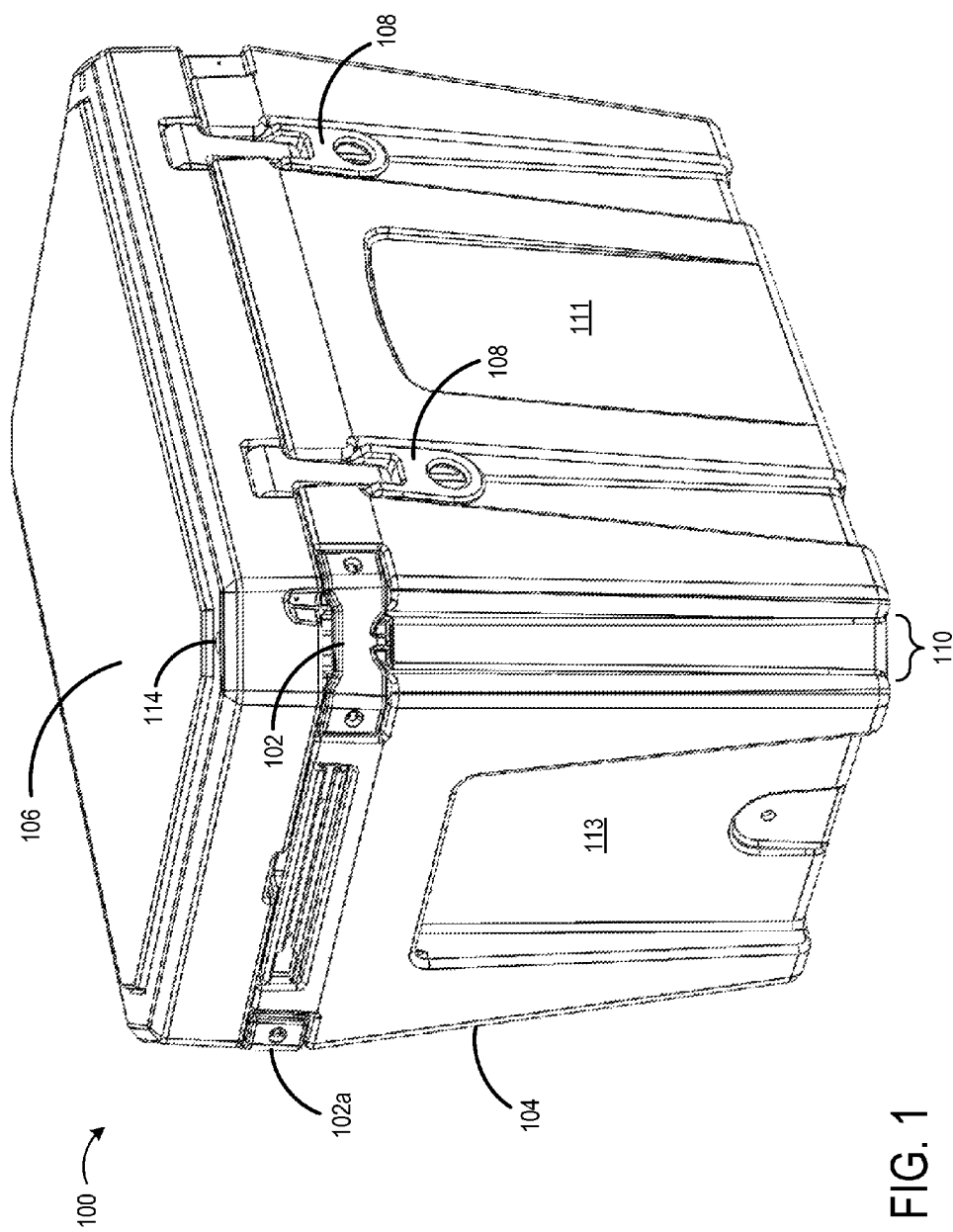
FIG. 1 shows an example cooler having a securing structure.

FIG. 1 shows an example cooler 100 having a securing structure 102, a body 104 and a lid 106 movably coupled to the body 104. The lid 106 is coupled to the body with a hinge, such that the clasps 108 can secure the lid 106 to the body 104 in a closed position. In other examples, the lid may be removable, and/or may include any other arrangement of elements for holding the lid closed. FIG. 1 further illustrates a recess 110 formed in the body 104. The securing structure 102 extends around a portion of the recess 110 formed in the body 110, thereby forming a first lock receptacle 112. In the depicted implementation, the recess 110 takes the form of a groove that extends a length of a corner of the cooler 100 from the lid 106 to the cooler bottom. In other implementations, the recess 110 may extend partially along the cooler corner, instead of the full length, and/or may be positioned at a location other than the cooler corner, such as along a front 111 or side face 113 of the cooler 100.

Figure 2:
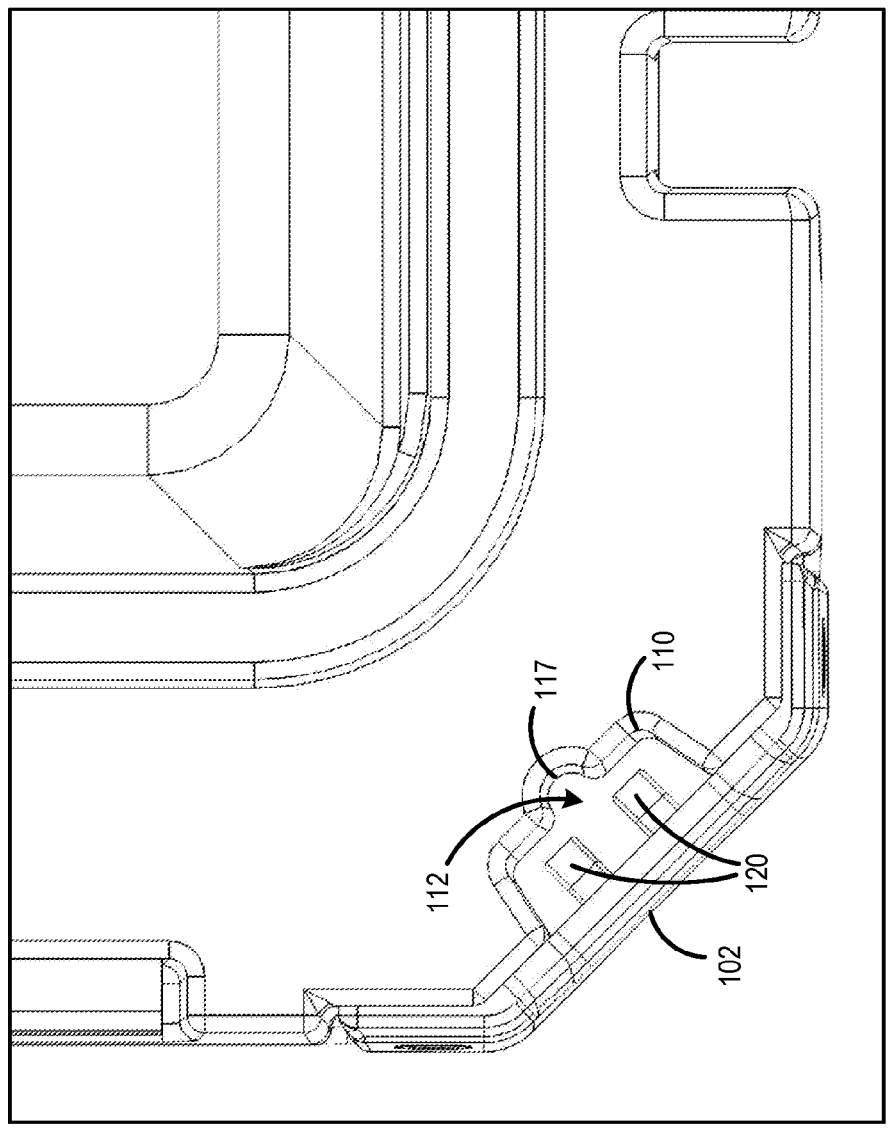
FIG. 2 shows a top view of the securing structure.

FIG. 2 shows a top-down view of the cooler body 104 without the lid 106. As shown, the groove 110 forming the first locking receptacle 112 includes a semicircular notch 117, which may accommodate a part of a cable or lock, and may be at a location complementary to a second lock receptacle 114 formed in the lid 106. FIG. 2 also shows bottle opener features 120, described in more detail below.

Figure 3:
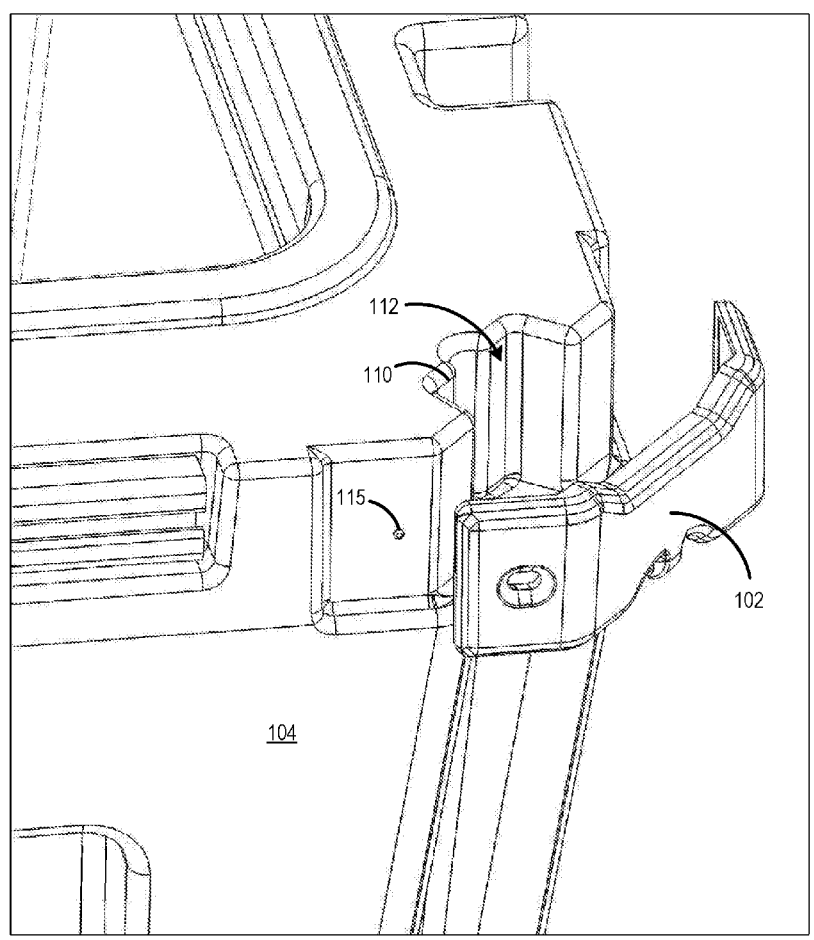
FIG. 3 shows an exploded view of the securing structure.

FIG. 3 shows an exploded view of the securing structure 102 and cooler body 104. The cooler body 104 includes one or more fastener receivers 115 incorporated into the body 104 to receive fasteners, such as bolts or screws that attach the securing structure 102 to the cooler body 104. In other examples, the securing structure 102 may be riveted to the cooler body 104, may be attached to the body 104 without the use of fasteners, such as via welding (e.g. where the securing structure 102 and the cooler body 104 are made from a weldable polymer material) or adhesive, or may be attached via any other suitable mechanism. In yet other examples, the securing structure 102 and cooler body 104 may be formed as a single molded part.

As mentioned above, the securing structure 102 may be used to lock the cooler lid 106 to the cooler body 104 such that the lid cannot be opened by others. Referring again to FIG. 1, the second lock receptacle 114 is positioned in the lid 106 such that it aligns over the first lock receptacle 112 when the lid 106 is in the closed position. Thus, when the lid 106 is closed, a lock, cable or other locking device may be inserted through both the first lock receptacle 112 and the second lock receptacle 114 to lock the lid 106 to the body 104.

Figure 4:
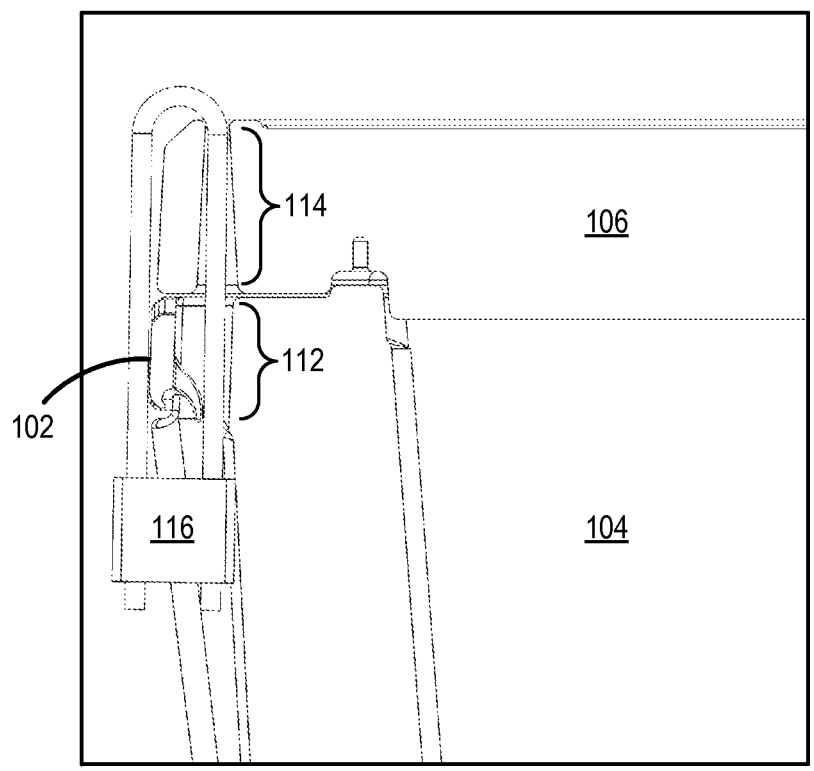
FIG. 4 shows a sectional view of a locking device locking the lid to the body of the cooler.

FIG. 4 shows a sectional view of a locking device 116 inserted through the first lock receptacle 112 and the second lock receptacle 114. In this configuration, the locking device 116 locks the lid 106 to the cooler body 104, preventing the cooler 100 from being opened. A cable lock, or other suitable locking device, also may be used to lock the lid 106 to the cooler body 104. Additionally, the locking device 116 may be attached to a cable (not shown) or other suitable device to fasten the cooler 100 to an external object for additional security.

Figure 5:
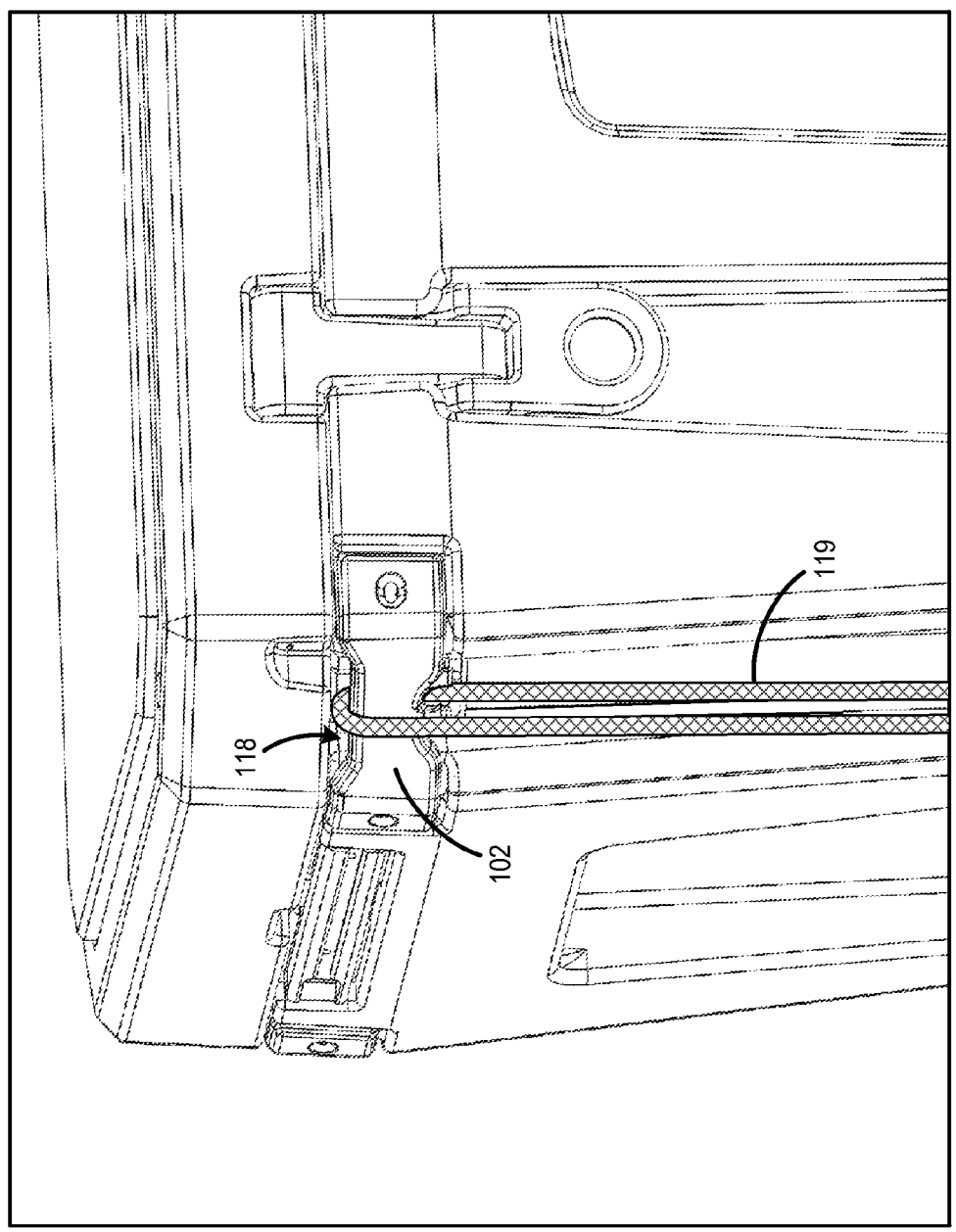
FIG. 5 shows a gap receiving a cable lock attached to the securing structure while leaving the lid free to open.

In some instances it may be desirable to open and access the inside of the cooler 100 while the cooler 100 remains locked to an external object. If the cooler were locked as shown in FIG. 4, the locking device 116 would need to be removed each time the contents were accessed, which may be inconvenient. As such, the securing structure 102 is configured to form a gap 118 between the top of the securing structure and the bottom surface of the lid 106 when the lid 106 is closed to accommodate a locking device such as a cable lock 119, as shown in FIG. 5. As depicted, the cable lock 119, which is inserted through the first lock receptacle 112 and the gap 118, has sufficient room in the gap to allow the lid 106 to be fully closed. In this configuration, the cable lock 119 may be used to secure the cooler 100 to an external object, e.g. in a vehicle for transport. It will be understood that the gap 118 may be configured to accommodate any other type of locking device, such as a padlock or combination lock, which may then be attached to a cable or the like for securing to an external object. The gap 118 also may accommodate other structures than a locking device, such as ropes, straps, bungee cords and/or other tie-downs that may be used to secure the cooler 100 to an external object. Thus, the gap 118 allows the securing structure 102 to act as an attachment point for attaching the cooler 100 to an external object while allowing the lid 106 to be opened.

As mentioned above, while FIGS. 1-5 depict the securing structure 102 as being positioned on a corner of the body 104 of the cooler 100, it will be understood that the recess 110 and the securing structure 102 may be positioned at any suitable location of the body 104. It will be further understood that the cooler 100 may include any suitable number of additional recesses formed in the body 104 and corresponding additional securing structures as described above. For example, FIG. 1 may include a second recess formed in the body and a second securing structure 102a extending around at least a portion of the second recess. In FIG. 1, the second securing structure 102a is positioned at a back corner of the cooler body 104. In other implementations, the second securing structure 102a may be positioned at a different corner or other suitable location. Further, in some examples, each of the four corners of the body 104 may have a recess and corresponding securing structure. In these examples, the securing structures may further act as bumpers or shock absorbers for the cooler 100 as the cooler 100 impacts surfaces of other objects, such as when sliding the cooler 100 into a bed of a pickup truck.

Figure 6:
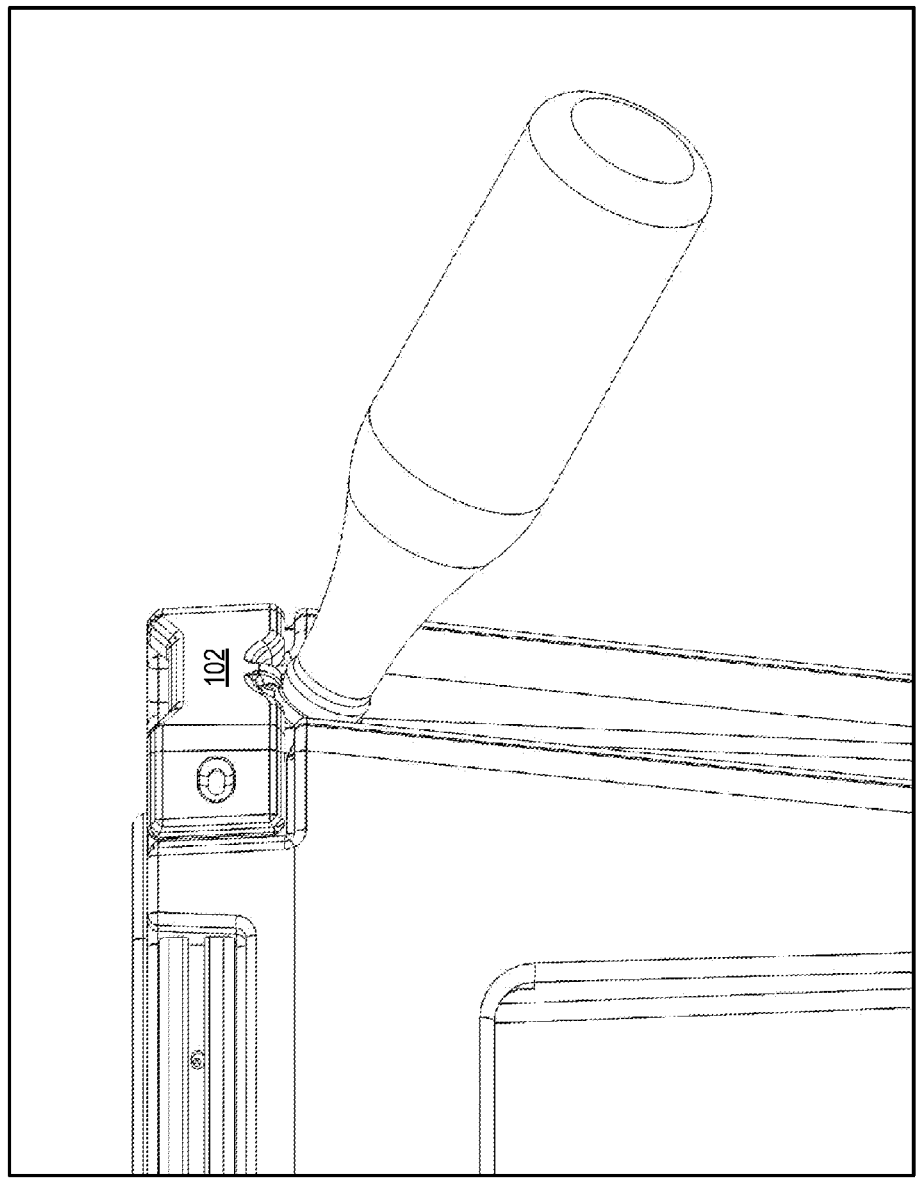
FIG. 6 shows the use of an integrated bottle opener of the securing structure.
Figure 7:
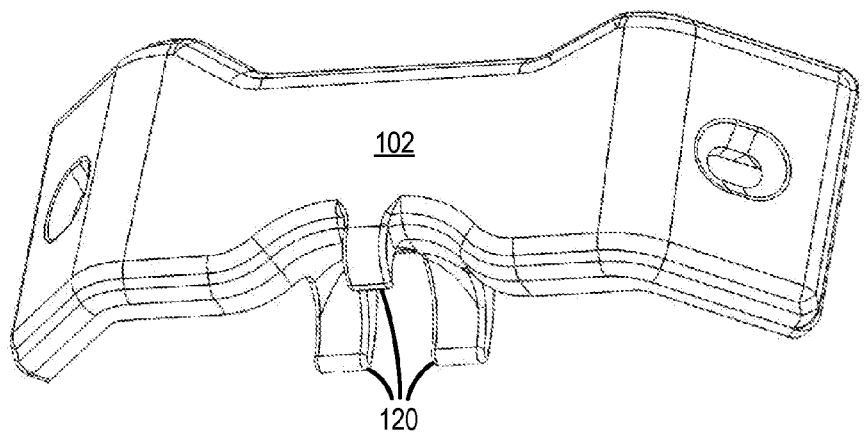
FIG. 7 shows a close-up schematic of a front view of the securing structure.
Figure 8:
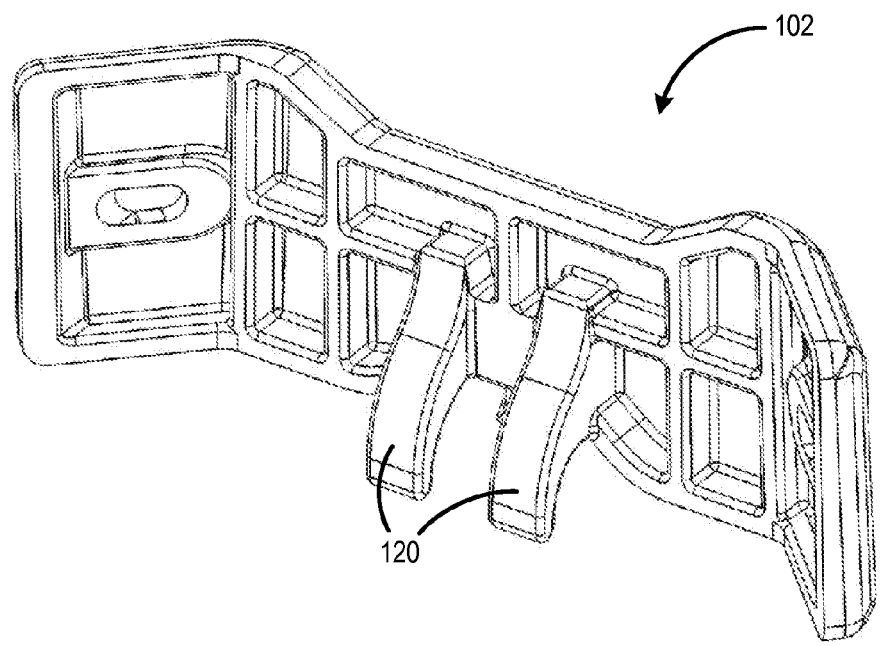
FIG. 8 shows a close-up schematic of a back view of the securing structure.

As mentioned above, the securing structure 102 may provide additional functions, such as including an integrated bottle opener. FIG. 6 illustrates the use of an integrated bottle opener, and FIGS. 7 and 8 respectively show a front view and back view of the securing structure 102 and bottle opener features 120 in more detail. The depicted bottle opener features 120 take the form of prong structures including one prong protruding from a front side of the securing structure 102 to engage an edge of the bottle cap, and two prongs protruding from a back side of the securing structure 102 to contact a top of the bottle cap. In other implementations, the bottle opener features 120 may take any other suitable form.

It will be understood that the configurations and/or approaches described herein are exemplary in nature, and that these specific embodiments or examples are not to be considered in a limiting sense, because numerous variations are possible. The subject matter of the present disclosure includes all novel and nonobvious combinations and sub-combinations of the various processes, systems and configurations, and other features, functions, acts, and/or properties disclosed herein, as well as any and all equivalents thereof.

The invention claimed is:

1. A cooler, comprising:
   a body;
   a lid movably coupled to the body;
   a recess formed in the body;
   a securing structure extending around at least a portion of the recess thereby forming a first receptacle, the first receptacle configured to accommodate a locking device, the securing structure comprising at least one protrusion configured to engage a bottle cap;
   a second receptacle formed in the lid and positioned to align over the first receptacle when the lid is in a closed position; and
   a gap located between the securing structure and the lid, the gap being configured to accommodate the locking device when the locking device is positioned through the first receptacle when the lid is in the closed position.

2. The cooler of claim 1, wherein the securing structure is integral with the body.

3. The cooler of claim 1, wherein the securing structure is attached to the body.

4. The cooler of claim 1, further comprising fastener receivers incorporated into the body to receive fasteners that attach the securing structure to the body.

5. The cooler of claim 1, wherein the first receptacle of the securing structure is further configured to accommodate a strap, and wherein the gap located between the securing structure and the lid is configured to accommodate the strap when the strap is positioned through the first receptacle and not the second receptacle when the lid is in the closed position.

6. The cooler of claim 1, wherein the securing structure is at least partially formed from a metal material.

7. The cooler of claim 1, wherein the securing structure is positioned on a corner of the body.

8. The cooler of claim 1, wherein the securing structure is a first securing structure, wherein the recess is a first recess, and wherein the cooler comprises a second securing structure extending around at least a portion of a second recess formed in the body.

9. A cooler, comprising:
   a body;
   a lid movably coupled to the body;
   a recess formed in the body;
   a securing structure attached to the body and extending around at least a portion of the recess thereby forming a first receptacle, the first receptacle configured to accommodate a locking device and a strap;
   a second receptacle formed in the lid and positioned to align over the first receptacle when the lid is in a closed position; and
   a gap located between the securing structure and the lid and configured to accommodate the locking device when the locking device is positioned through the first receptacle and not the second receptacle when the lid is in the closed position.

10. The cooler of claim 9, further comprising fastener receivers incorporated into the body to receive fasteners that attach the securing structure to the body.

11. The cooler of claim 9, wherein the securing structure comprises one or more prongs that form a bottle opener.

12. The cooler of claim 9, wherein the securing structure is at least partially formed from a metal material.

13. The cooler of claim 9, wherein the securing structure is positioned on a corner of the body.

14. The cooler of claim 9, wherein the securing structure is a first securing structure, and wherein the cooler comprises a second securing structure extending around at least a portion of a second recess formed in the body.

15. A cooler, comprising:
a body;
a lid movably coupled to the body;
a plurality of recesses formed in the body; and
for each of the plurality of recesses,
a securing structure extending around at least a portion of the recess thereby forming a first receptacle, the first receptacle configured to accommodate one or more of a locking device and a strap, the securing structure comprising at least one protrusion configured to engage a bottle cap,
a second receptacle formed in the lid and positioned to align over the first receptacle when the lid is in a closed position, and
a gap located between the securing structure and the lid and configured to accommodate the locking device when the locking device is positioned through the first receptacle when the lid is in the closed position.

16. The cooler of claim 15, wherein each securing structure is integral with the body.

17. The cooler of claim 15, wherein each securing structure is attached to the body.

18. The cooler of claim 15, further comprising fastener receivers incorporated into the body to receive fasteners that attach each securing structure to the body.

19. The cooler of claim 15, wherein the first receptacle of the each securing structure is further configured to accommodate a strap, and wherein the gap located between the securing structure and the lid is also configured to accommodate the strap when the strap is positioned through the first receptacle and not the second receptacle when the lid is in the closed position.

20. The cooler of claim 15, wherein each recess is formed in a corresponding corner of the body and is at least partially surrounded by a corresponding securing structure.

* * * * *